(12) United States Patent
Shao et al.

(10) Patent No.: US 7,944,897 B2
(45) Date of Patent: May 17, 2011

(54) METHOD AND SYSTEM FOR ADDRESSING CHANNEL ACCESS UNFAIRNESS IN IEEE 802.11N WIRELESS NETWORKS

(75) Inventors: Huai-Rong Shao, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 764 days.

(21) Appl. No.: 11/589,519

(22) Filed: Oct. 30, 2006

(65) Prior Publication Data

US 2007/0116035 A1 May 24, 2007

Related U.S. Application Data

(60) Provisional application No. 60/733,528, filed on Nov. 3, 2005.

(51) Int. Cl.
*H04W 4/00* (2009.01)

(52) U.S. Cl. ........ 370/338; 370/328; 370/322; 455/448; 455/455

(58) Field of Classification Search .................. 370/310, 370/328, 338, 322; 455/448, 455
See application file for complete search history.

(56) References Cited

U.S. PATENT DOCUMENTS

| | | | |
|---|---|---|---|
| 6,795,421 B1 | 9/2004 | Heinonen et al. | |
| 6,807,158 B2 | 10/2004 | Krishnamurthy et al. | |
| 6,925,064 B2 | 8/2005 | Hester et al. | |
| 7,088,702 B2 | 8/2006 | Shvodian | |
| 7,127,254 B2 | 10/2006 | Shvodian et al. | |
| 7,184,767 B2 | 2/2007 | Gandolfo | |
| 7,251,235 B2 | 7/2007 | Wentink | |
| 7,280,518 B2 | 10/2007 | Montano et al. | |
| 7,280,801 B2 | 10/2007 | Dahl | |
| 7,356,341 B2 | 4/2008 | Nanda | |
| 7,359,398 B2 | 4/2008 | Sugaya | |
| 7,400,899 B2 | 7/2008 | Shin et al. | |
| 7,474,686 B2 | 1/2009 | Ho | |
| 7,545,771 B2 | 6/2009 | Wentink et al. | |
| 7,561,510 B2* | 7/2009 | Imamura et al. ............. | 370/205 |
| 2003/0003905 A1 | 1/2003 | Shvodian | |
| 2003/0137970 A1 | 7/2003 | Odman | |
| 2003/0137993 A1 | 7/2003 | Odman | |
| 2003/0152059 A1 | 8/2003 | Odman | |
| 2003/0214967 A1 | 11/2003 | Heberling | |
| 2004/0053621 A1 | 3/2004 | Sugaya | |
| 2004/0058686 A1 | 3/2004 | Odman | |

(Continued)

OTHER PUBLICATIONS

IEEE Wireless LAN Edition (2003), "A compilation based on IEEE Std. 802.11TM-1999 (R 2003) and its Amendments."

(Continued)

*Primary Examiner* — Kent Chang
*Assistant Examiner* — Marcus Hammonds
(74) *Attorney, Agent, or Firm* — Kenneth L. Sherman, Esq.; Michael Zarrabian, Esq.; Myers Andras Sherman & Zarrabian LLP

(57) ABSTRACT

A method and system for communication in an IEEE 802.11n WLAN including L-stations and HT-stations, wherein a signaling field such as a small legacy format frame is appended at the end of a L-SIG TXOP Protection sequence in order to terminate the EIFS procedure at L-stations. This increases the probability for L-stations to obtain access to a shared communication channel relative to HT-stations.

37 Claims, 8 Drawing Sheets

U.S. PATENT DOCUMENTS

| | | | |
|---|---|---|---|
| 2004/0136396 A1* | 7/2004 | Yonge et al. | 370/445 |
| 2004/0199686 A1 | 10/2004 | Karaoguz | |
| 2004/0214571 A1 | 10/2004 | Hong | |
| 2004/0218683 A1 | 11/2004 | Batra et al. | |
| 2004/0264475 A1* | 12/2004 | Kowalski | 370/395.5 |
| 2005/0058151 A1* | 3/2005 | Yeh | 370/445 |
| 2005/0130634 A1 | 6/2005 | Godfrey | |
| 2005/0135318 A1* | 6/2005 | Walton et al. | 370/338 |
| 2005/0226270 A1* | 10/2005 | Liu et al. | 370/469 |
| 2005/0232275 A1* | 10/2005 | Stephens | 370/394 |
| 2005/0238016 A1* | 10/2005 | Nishibayashi et al. | 370/389 |
| 2005/0271019 A1* | 12/2005 | Yuan et al. | 370/338 |
| 2006/0002428 A1* | 1/2006 | Trainin | 370/503 |
| 2006/0050742 A1* | 3/2006 | Grandhi et al. | 370/506 |
| 2006/0072492 A1* | 4/2006 | Trainin | 370/328 |
| 2006/0126545 A1* | 6/2006 | Nanda | 370/310 |
| 2006/0135188 A1* | 6/2006 | Murty et al. | 455/501 |
| 2006/0166683 A1 | 7/2006 | Sharma et al. | |
| 2006/0176908 A1* | 8/2006 | Kwon et al. | 370/473 |
| 2006/0187852 A1* | 8/2006 | Kwon et al. | 370/252 |
| 2006/0193279 A1* | 8/2006 | Gu et al. | 370/312 |
| 2006/0268800 A1 | 11/2006 | Sugaya et al. | |
| 2006/0285516 A1* | 12/2006 | Li et al. | 370/329 |
| 2007/0089029 A1* | 4/2007 | Ginzburg et al. | 714/762 |
| 2007/0116035 A1 | 5/2007 | Shao et al. | |
| 2007/0280180 A1* | 12/2007 | Dalmases et al. | 370/338 |
| 2008/0013567 A1* | 1/2008 | Benveniste | 370/447 |
| 2008/0212604 A1* | 9/2008 | Liu | 370/448 |
| 2008/0291873 A1* | 11/2008 | Benveniste | 370/329 |
| 2009/0052389 A1 | 2/2009 | Qin et al. | |
| 2009/0323611 A1 | 12/2009 | Singh et al. | |
| 2010/0002639 A1 | 1/2010 | Qin et al. | |
| 2010/0046518 A1* | 2/2010 | Takagi et al. | 370/392 |

OTHER PUBLICATIONS

IEEE 802.11e/D13.0 (Jan. 2005), "Amendment: Medium Access Control (MAC) Quality of Service (QoS) Enhancements."

S. A. Mujtaba "TGn Sync Proposal Technical Specification," IEEE 802.11-04-08 89r7, Jul. 2005.

Kim, S. et al., "QoS enhancement scheme of EDCF in IEEE 802.11e wireless LANs," Electronics Letters 40(17): pp. 1091-1092, Aug. 19, 2004, U.S.

IEEE 802.11, "Standard for Information Technology—Telecommunications and Information Exchange between Systems—Local and Metropolitan Area Networks—Specific requirements—Part 11: Wireless LAN Medium Access Control (MAC) and Physical Layer (PHY) Specifications," 2007 Revision of IEEE Std 802.11-1999, IEEE Computer Society, 1232 pages, Jun. 12, 2007. U.S.

IEEE 802.16e™, "Standard for Local and Metropolitan Area Networks—Part 16: Air Interface for Fixed and Mobile Broadband Wireless Access Systems; Amendment 2: Physical and Medium Access Control Layers for Combined Fixed and Mobile Operation in Licensed Bands and Corrigendum 1," Feb. 28, 2006, pp. 1-864, U.S.

U.S. Non-final Office Action mailed Jun. 27, 2006, for U.S. Appl. No. 11/044,600.

U.S. Non-final Office Action mailed Aug. 21, 2007, for U.S. Appl. No. 11/044,600.

U.S. Final Office Action mailed Jan. 15, 2008, for U.S. Appl. No. 11/044,600.

U.S. Non-final Office Action mailed Aug. 7, 2008, for U.S. Appl. No. 11/044,600.

International Search Report dated Jan. 9, 2009 for International Application No. PCT/KR2008/004793 from Korean Intellectual Property Office, filed Aug. 19, 2008, pp. 1-2.

Harada, H., "Unified and Flexible Millimeter Wave WPAN Systems Supported by Common Mode," IEEE P802.15 Working Group for Wireless Personal Area Networks (WPANs), IEEE 802.15-07-0761-10-003c, Sep. 18, 2007, Slides 1-62, United States.

U.S. Non-Final Office Action mailed Jan. 25, 2007 for U.S. Appl. No. 11/044,600.

U.S. Advisory Action mailed May 15, 2008 for U.S. Appl. No. 11/044,600.

* cited by examiner

METHOD AND SYSTEM FOR ADDRESSING CHANNEL ACCESS UNFAIRNESS IN IEEE 802.11N WIRELESS NETWORKS

RELATED APPLICATION

This application claims the benefit of U.S. Provisional Patent Application Ser. No. 60/733,528, filed on Nov. 3, 2005, incorporated herein by reference.

FIELD OF THE INVENTION

The present invention relates to wireless networks, and in particular, to frame fairness in IEEE 802.11n wireless local area networks (WLANs).

BACKGROUND OF THE INVENTION

In many wireless communication systems, a frame structure is used for data transmission between a transmitter and a receiver. For example, the IEEE 802.11 standard uses frame aggregation in a Media Access Control (MAC) layer and a physical (PHY) layer. In a typical wireless station such as a transmitter, a MAC layer inputs a MAC Service Data Unit (MSDU) from upper layers and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the transmitter to attach a PHY header thereto to construct a PHY Protocol Data Unit (PPDU) for transmission to another wireless station such as a receiver. The PHY header includes parameters for determining a transmission scheme including a coding/modulation scheme.

In IEEE 802.11n WLAN communications, if legacy stations (L-stations) and high-throughput stations (HT-stations) coexist in the same WLAN, then frames of the HT-stations use a mixed mode PHY layer header which includes both a legacy PHY header part and a high-throughput (HT) PHY header part. FIG. 1 shows a legacy format frame 10 in which a legacy PHY header part 12 includes legacy training fields (L-TFs) 14 and a legacy signal field (L-SIG) 16. Further, an HT PHY header part 18 includes an HT signal field (HT-SIG) 20 and HT training fields (HT-TFs) 22. The frame 10 further includes a MPDU 24 containing data. A legacy duration or period 26 indicates communication of the HT-SIG 20, the HT-TFs 22, the MPDU 24 and a block acknowledgement field (BA) 28, over a wireless channel.

Legacy format frames can be successfully received by both the L-stations and the HT-stations. However, the L-stations cannot receive HT frames successfully because the L-stations cannot understand the HT PHY header part of the HT frames.

The frame format in FIG. 1 implements an extended PHY protection approach for an exchange of frames (packets) when the L-stations and the HT-stations coexist in the same WLAN. FIG. 2 shows an example of channel access in an IEEE 802.11n network based on a L-SIG Transmission Opportunity Protection (L-SIG TXOP Protection) approach using the frame format of FIG. 1. The L-SIG TXOP Protection approach uses the L-SIG 16 in the PHY header 12 to prevent legacy transmission of the contents of more than one HT format PPDU. A station (STA) such as a receiver STA may use L-SIG TXOP Protection for an exchange of packets by utilizing the L-SIG portion of an HT PPDU. With L-SIG TXOP Protection, a Network Allocation Vector (NAV) is used within IEEE 802.11n networks to prevent the STAs from accessing a shared wireless channel and causing contention. The NAV is maintained by each STA and is an indicator of time periods when transmission will not be initiated even though a Clear Channel Assessment (CCA) function of the STAs does not indicate traffic on the channel. A NAV duration value is virtually carried in the length and rate fields of the L-SIG.

L-SIG TXOP Protection provides robust protection for third party HT stations along with L-stations using HT PPDUs, enabling protection packets to be sent in optimized multiple-input-multiple-output (MIMO) PPDUs.

When L-SIG TXOP Protection is in effect, the length and rate fields of the L-SIG are set so that the end point of the legacy duration or period (i.e., the ratio of legacy length and legacy rate), is equivalent to the intended NAV duration by subtracting an Extended Interframe Space (EIFS) period 30 from a DCF Interframe Space (DIFS) period 32.

In IEEE 802.11n networks, when the channel (e.g., a radio link) has been free of any traffic for a period greater than the DIFS period 32, then the STAs may have immediate access to the channel in a contention-based service. The EIFS period 30 is longer than the DIFS period 32, wherein the EIFS 30 period is only used by a STA when there has been an error in frame transmission whereby the STA waits for an EIFS period 30 before trying to access the channel again. A L-station that decodes the L-SIG length and rate fields will continue receiving communications for the legacy duration, thereby preventing the L-station from starting communication over the channel during this EIFS period. This leads to unfairness for L-stations in gaining access to the channel relative to HT-stations.

To avoid unfairness towards L-stations, each L-SIG TXOP Protection duration (period) 34 is set according to an interval 36 that represents the difference between corresponding EIFS and DIFS periods (i.e., an EIFS-DIFS interval adjustment). The EIFS-DIFS interval 36 is shorter than the actual NAV protection period. This is intended to avoid unfairness towards the L-stations which defer for an EIFS period upon receiving a PPDU using L-SIG TXOP Protection (causing a Cyclic Redundancy Code (CRC) error). The HT-stations add the EIFS-DIFS interval to the L-SIG TXOP Protection duration when setting the NAV value for a PPDU that uses L-SIG TXOP Protection.

However, the EIFS-DIFS interval cannot solve the unfairness problem for the L-stations. This is because the EIFS period begins following an indication by the PHY layer that the channel is idle after detection of an erroneous frame, without regard to the virtual carrier-sense mechanism. Two conditions must be satisfied to start the EIFS period: (1) detection of an erroneous frame from a PHY or a MAC CRC verification, and (2) after detection, but before start of the EIFS period, the channel must be idle as indicated by a PHY CCA. After a L-SIG TXOP Protection sequence, HT-stations can contend for the channel earlier than L-stations. Therefore, the L-stations have lower probability of gaining access to the shared channel than the HT-stations. This causes channel access unfairness for L-stations.

FIG. 3 shows another example of channel access based on extended PHY protection (EPP). Each station may use EPP to provide protection for an exchange of packets, wherein the L-SIG in the PHY header is used to protect against legacy transmission of contents of more than one HT format PPDU.

In the example in FIG. 3, the last frame in the EPP sequence is transmitted as a legacy format frame. Since as noted above the L-stations cannot correctly receive that last frame, the duration in the L-SIG is set to the end of the EPP sequence in EPP duration 35, such that the L-stations will start an EIFS procedure at the end of the EPP sequence (e.g., L-SIG TXOP Protection sequence). However, this is still unfair for the L-stations since the HT-stations can start a DIFS procedure at the end of a L-SIG TXOP Protection sequence in a L-SIG TXOP Protection duration but the L-stations cannot.

BRIEF SUMMARY OF THE INVENTION

The present invention provides a method and system for channel access in wireless communication systems such as IEEE 802.11n wireless networks. In one embodiment, the present invention provides a method and system for communication in an IEEE 802.11n WLAN including L-stations and HT-stations, wherein compared to conventional approaches, the L-stations have increased probability of gaining access to a shared communication channel relative to the HT-stations.

In one implementation of the present invention, a signaling field, such as a small legacy format frame, is appended at the end of a L-SIG TXOP Protection sequence in order to terminate the EIFS procedure at the L-stations. This increases the probability for the L-stations to obtain access to a shared communication channel relative to the HT-stations.

In another embodiment, the present invention provides a wireless communication station for wireless communication such as IEEE 802.11n WLAN. The communication station comprises a control function that is configured to append a signaling field to the end of a L-SIG TXOP Protection sequence for transmission of frames, and a PHY layer is configured to transmit the L-SIG TXOP Protection sequence frames along with the appended signaling field. In one example, the signaling field comprises a small legacy format frame.

The communication system includes L-stations and HT-stations, wherein the small legacy format frame causes termination of an EIFS procedure at an L-station such that the L-station resumes normal channel access, thereby increasing probability for the L-station gaining access to a shared communication channel relative to the HT-stations.

In accordance with further aspects of the present invention, the control function of the communication station is further configured such that if the last frame in the L-SIG TXOP Protection sequence is shorter than the EIFS period, then the control function sets the L-SIG TXOP Protection duration in the L-SIG to the end of the second to the last frame.

In accordance with further aspects of the present invention, the control function is further configured such that if the precise duration of the last frame in the L-SIG TXOP Protection sequence is unknown, then the control function sets the L-SIG TXOP Protection duration in the L-SIG to earlier than the end of the second to the last frame.

In accordance with further aspects of the present invention, the control function is further configured such that if the last frame in the L-SIG TXOP Protection sequence is longer than the EIFS period, then the control function sets the L-SIG TXOP Protection duration in the L-SIG to the end of the last frame.

These and other features, aspects and advantages of the present invention will become understood with reference to the following description, appended claims and accompanying figures.

BRIEF DESCRIPTION OF THE DRAWINGS

In the drawings, like reference numbers refer to like elements.

DETAILED DESCRIPTION OF THE INVENTION

The present invention provides a method and system for channel access in wireless communication systems such as IEEE 802.11n wireless networks. In one embodiment, the present invention provides a method and system for addressing channel access unfairness in an IEEE 802.11n WLAN including L-stations and HT-stations, wherein compared to a conventional L-SIG TXOP Protection approach, the L-stations have increased probability of gaining access to a shared communication channel relative to the HT-stations. In one implementation, increasing the probability of channel access by the L-stations involves appending a signaling field, such as a small legacy format frame, to the end of a L-SIG TXOP Protection sequence transmission. This causes termination of the EIFS procedure at a receiving L-station such that the L-station resumes normal channel access such as contending for the channel.

Figure 1:
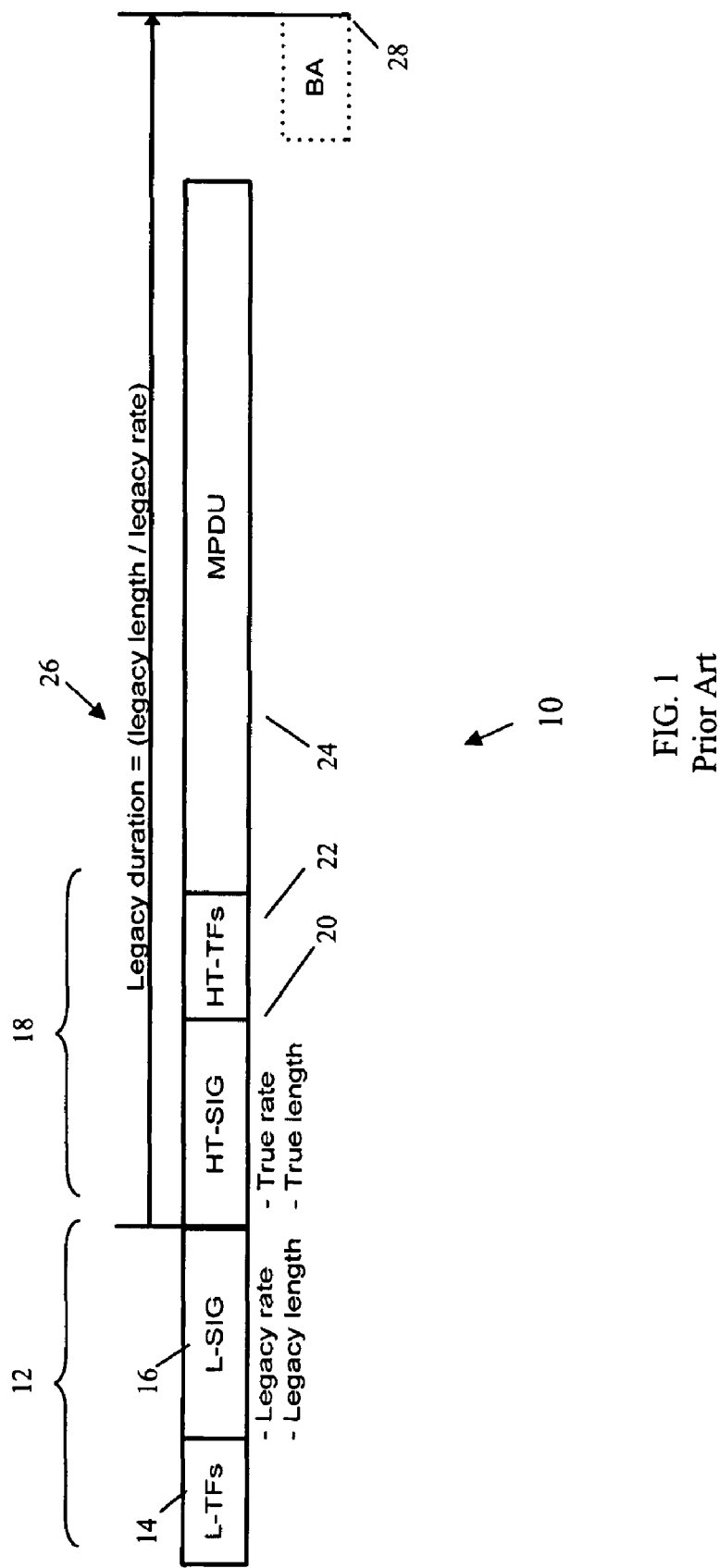
FIG. 1 shows a conventional frame format for an extended PHY protection approach.
Figure 2:
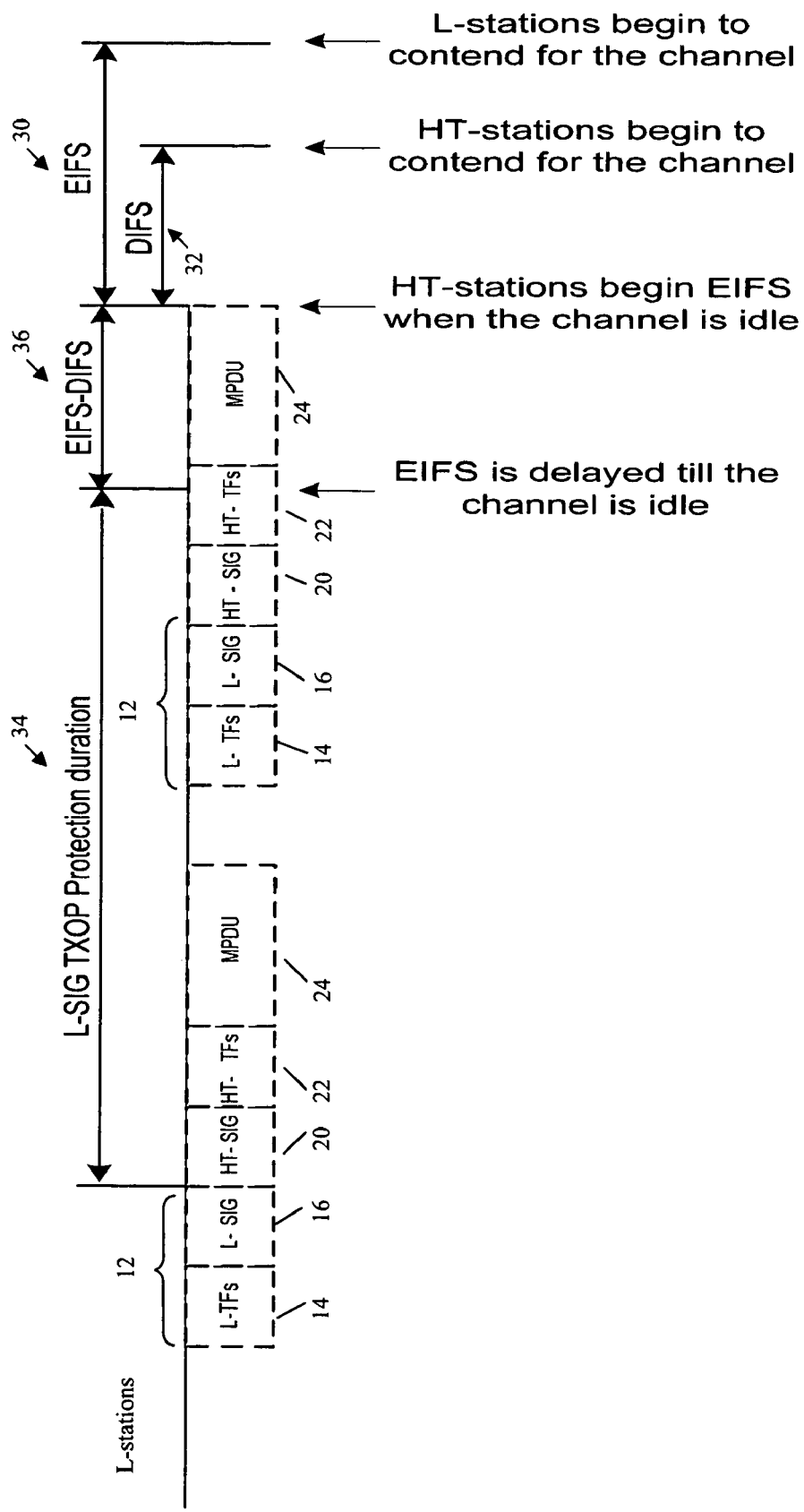
FIG. 2 shows a conventional L-SIG TXOP Protection approach with an EIFS-DIFS interval adjustment.
Figure 3:
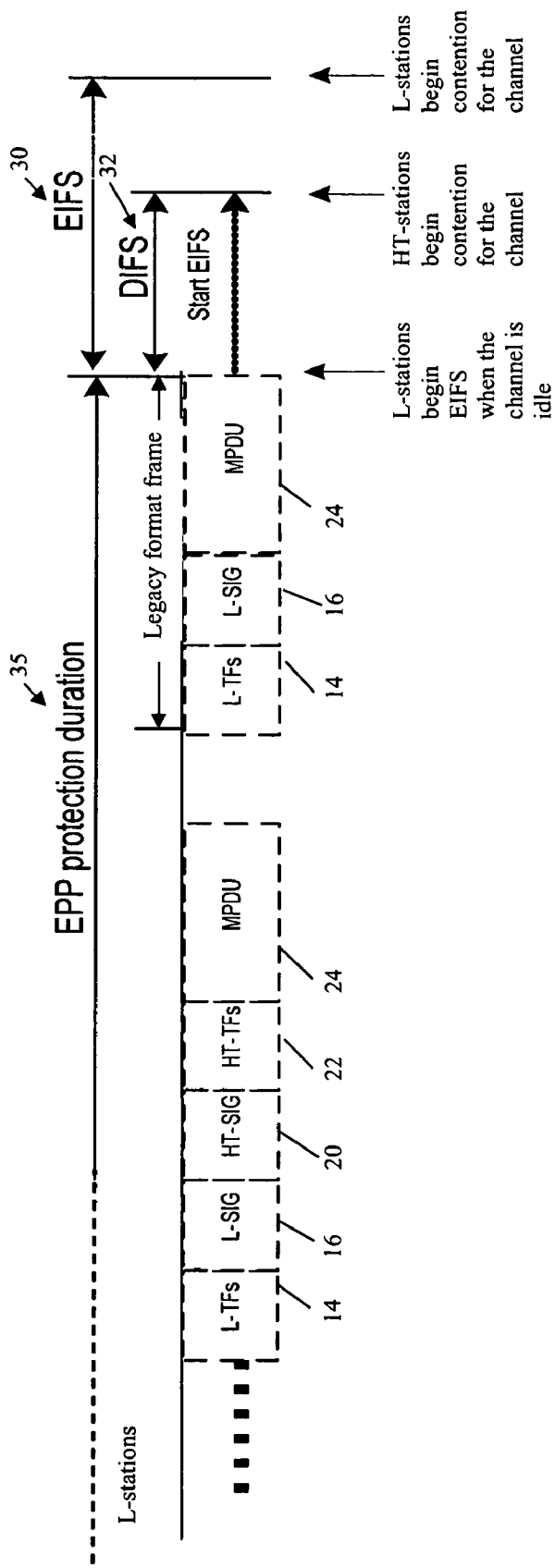
FIG. 3 shows a conventional EPP approach that implements L-SIG TXOP Protection with a legacy frame as a last frame.
Figure 4:
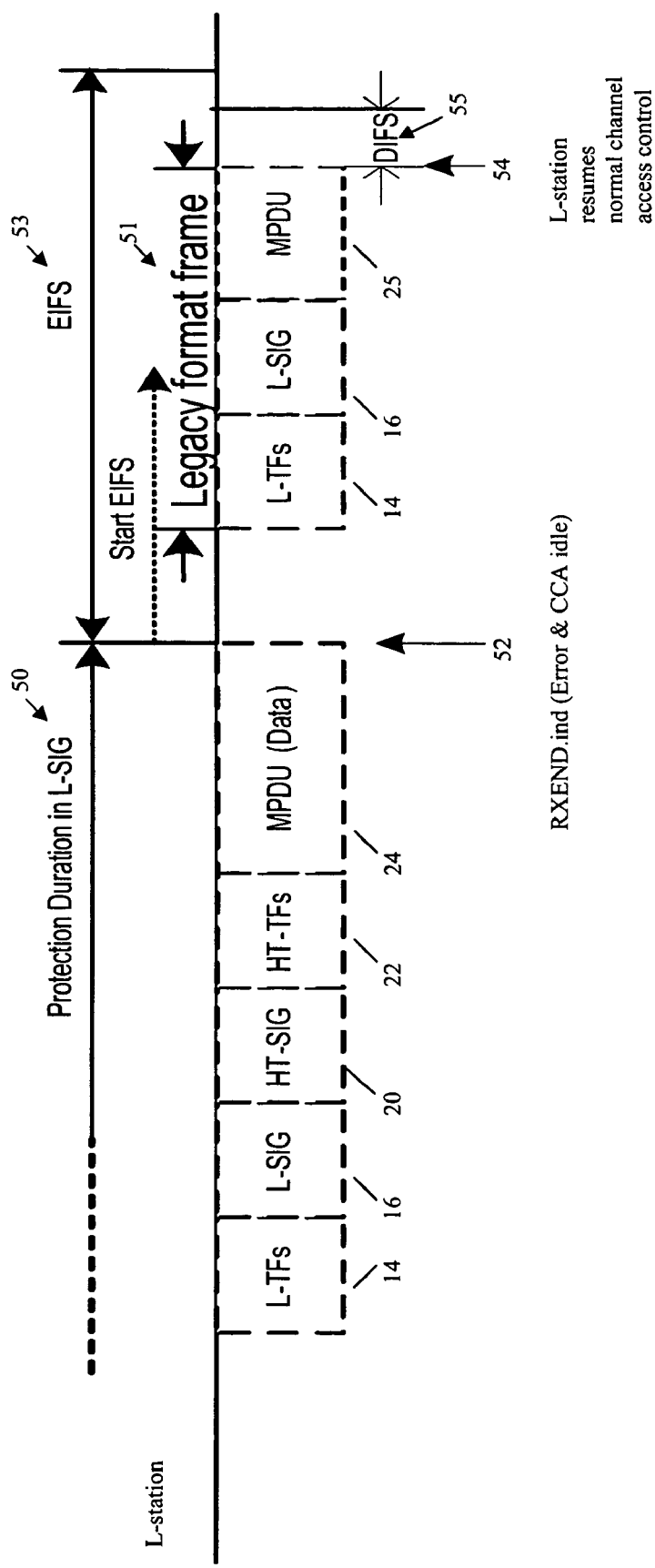
FIG. 4 shows a diagram of an example of appending a small legacy format frame at the end of an L-SIG TXOP Protection sequence to terminate the EIFS procedure at an L-station, according to an embodiment of the present invention.

FIG. 4 shows a diagrammatical example in which an L-station receives a L-SIG TXOP Protection sequence 50 followed by an appended small legacy format frame 51, according to said embodiment of the present invention. A first arrow 52 marks a condition that leads to the start of an EIFS procedure at the L-station. This condition involves: (1) detection of an erroneous frame from a PHY or a MAC CRC verification process, and (2) after detection, but before start of the EIFS period 53, the channel is idle as indicated by a PHY CCA. Further, a second arrow 54 marks termination of the EIFS procedure because the L-station receives said legacy format frame 51 correctly. The L-station then enters the DIFS period 55 after the legacy frame 51, whereby the L-station resumes normal channel access before the end of the EIFS period. This increases the probability of gaining access to the channel for the L-station relative to the HT-stations.

Figure 5:
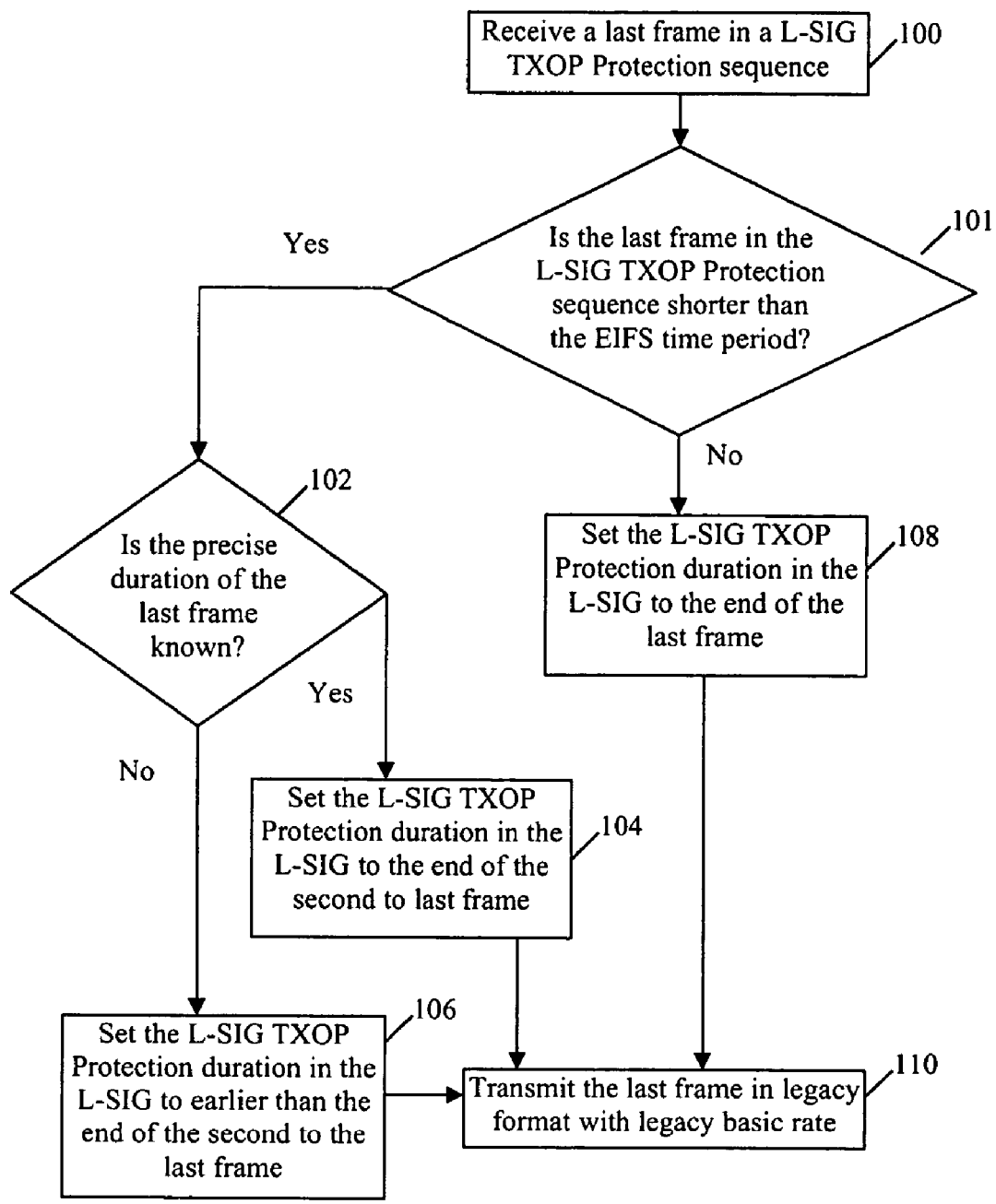
FIG. 5 shows a flowchart of the steps of appending a small legacy format frame at the end of an L-SIG TXOP Protection sequence, according to an embodiment of the present invention.

FIG. 5 shows a flowchart of an example communication process using the approach of FIG. 4, in a communication system that includes multiple wireless communication stations, according to an implementation of the present invention. The wireless communication stations include L-stations and HT-stations. An initiator station initiates the transmission of an L-SIG TXOP Protection sequence 50 with an appended small legacy format frame 51. The process includes the steps of:

Step 100: Receive a last frame in a L-SIG TXOP Protection sequence.

Step 101: Determine if the last frame (e.g., ACK, compressed BA, etc.) in a L-SIG TXOP Protection sequence is shorter than the EIFS period 53? If yes go to step 102. Otherwise, the last frame in the L-SIG TXOP Protection sequence is longer than the EIFS period 53, go to step 108.

Step 102: Determine if the precise duration of the last frame can be known? If yes, go to step 104, otherwise go to step 106.

Step 104: Set the L-SIG TXOP Protection duration in the L-SIG to the end of the second to the last frame. Go to step 110.

Step 106: Set the L-SIG TXOP Protection duration in the L-SIG to earlier than the end of the second to the last frame. Go to step 110.

Step 108: Set the L-SIG TXOP Protection duration in the L-SIG to the end of the last frame (the initiator sends a MPDU with MAC Duration=0, carried in a basic rate legacy PPDU (e.g., CF-END per IEEE 802.11n or QoS-Null per IEEE 802.11e), after a short interframe space (SIFS) period beyond a L-SIG TXOP Protection duration). Go to step 110.

Step 110: Transmit the last frame in legacy format (i.e., legacy format frame 51) at legacy basic rate.

Figure 6:
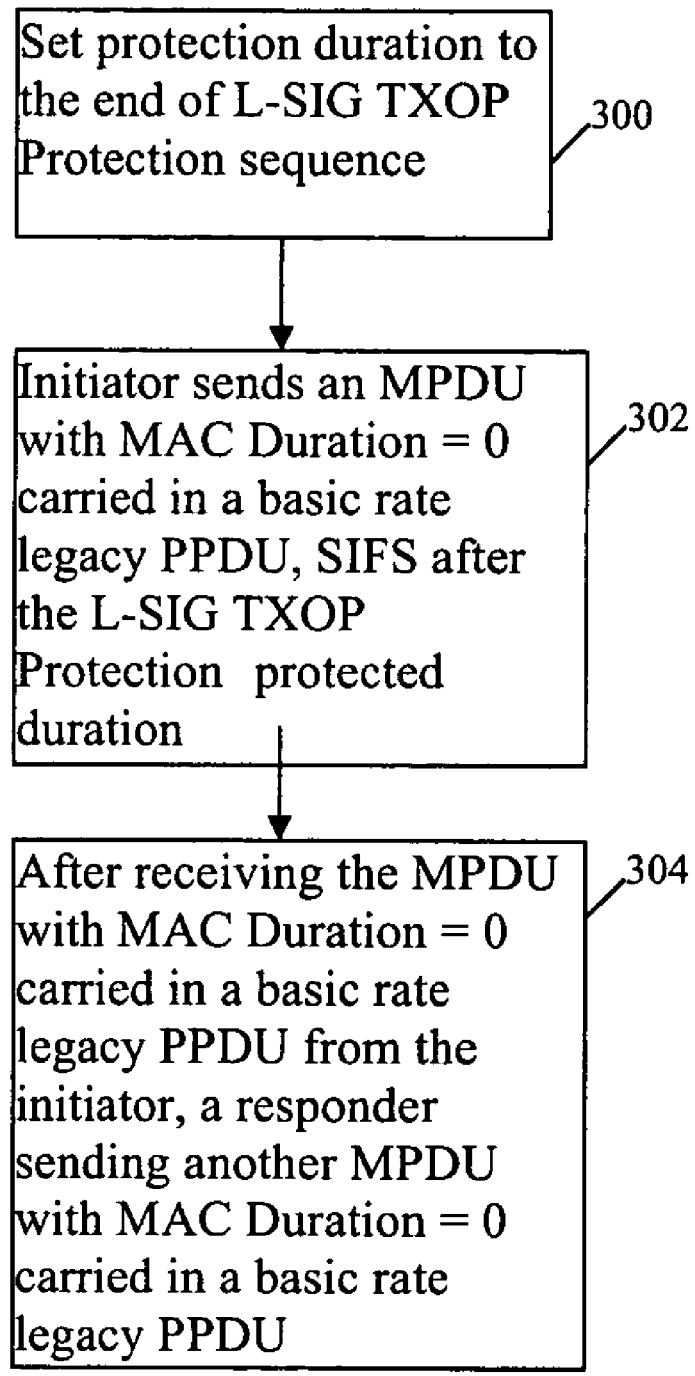
FIG. 6 shows a flowchart of additional steps in appending a second small legacy format frame in case some third-party L-STAs cannot hear the last small legacy format frame, according to an embodiment of the present invention.

If some third-party L-STAs (i.e., hidden terminals) that are far away from the STA that sent out the last frame in legacy format cannot hear that last frame, conventionally the third-party L-STAs still follow EIFS rules and unfairness problem still exists. According to an embodiment of the present invention, in case some third-party L-STAs (hidden L-STAs) cannot hear the last small legacy format frame, a second small legacy format frame is appended to the end of the L-SIG TXOP Protection sequence to enable L-STAs which cannot hear the first signaling field, to terminate the EIFS procedure. As such, when a hidden L-STA problem exists, both the transmission initiator and the responder send (append) a small legacy format frame at the end of the L-SIG TXOP Protection sequence. The second small legacy frame is sent after the initiator/responder receives the first small legacy frame. The flowchart in FIG. 6 provides an example implementation of such a communication process according to the present invention when some third-party L-STAs (hidden L-STAs) cannot hear the last small legacy format frame, including the steps of:

Step 200: Set the L-SIG TXOP Protection duration to the end of the L-SIG TXOP Protection sequence. There is no format and rate limitation for the last frame in the L-SIG TXOP Protection sequence.

Step 202: The initiator transmits an MPDU with MAC Duration=0 (such as CF-END or QoS-Null), which is carried in a basic rate legacy PPDU, after a SIFS period beyond the L-SIG TXOP Protection duration. This enables third party stations which can hear (receive from) the initiator, to terminate an EIFS procedure to avoid potential unfairness or a capture effect for L-stations among them.

Step 204: After receiving the MPDU with MAC Duration=0 from the initiator, a responder station sends another MPDU with MAC Duration=0 carried in a basic rate legacy PPDU, to the initiator. That MPDU can also be received by other stations. This further enables third party L-stations which can receive from the responder, but not the initiator, to terminate an EIFS procedure, thereby avoiding potential unfairness or a capture effect for the third party L-stations.

Figure 7:
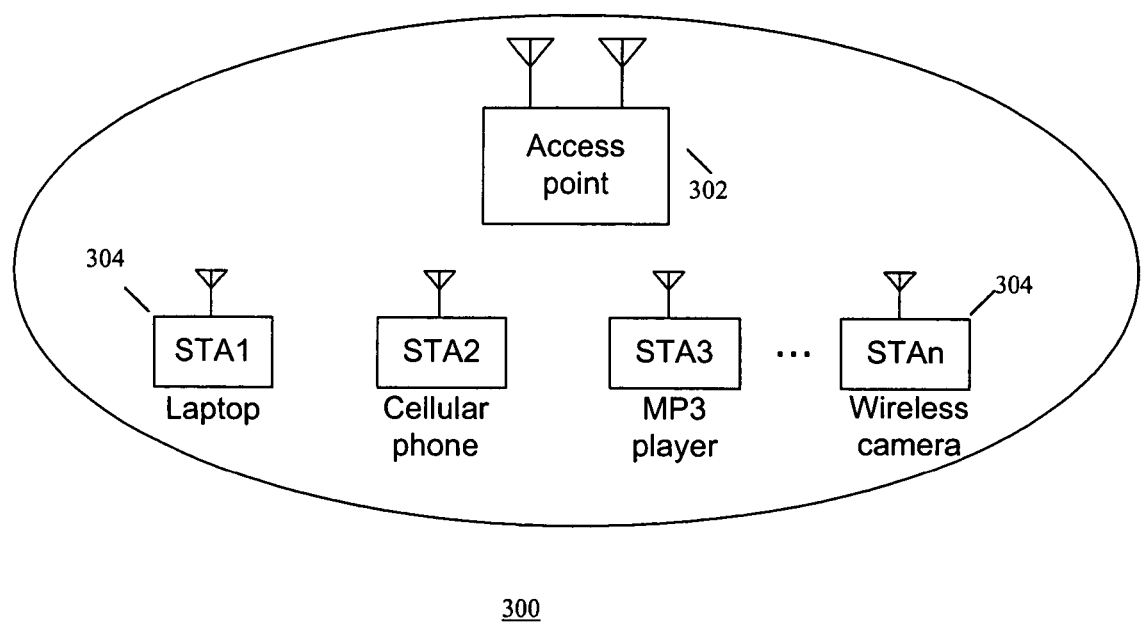
FIG. 7 shows the diagram of a WLAN which includes wireless communication stations such as an access point (AP) and n STAs, according to an embodiment of the present invention.

FIG. 7 shows a diagram of an example WLAN system 300 which includes communication stations such as an AP 302 and n STAs 304 (STA1, . . . , STAn), according to an embodiment of the present invention. The STAs 304 include HT-stations and L-stations. The AP 302 provides central coordination.

Figure 8:
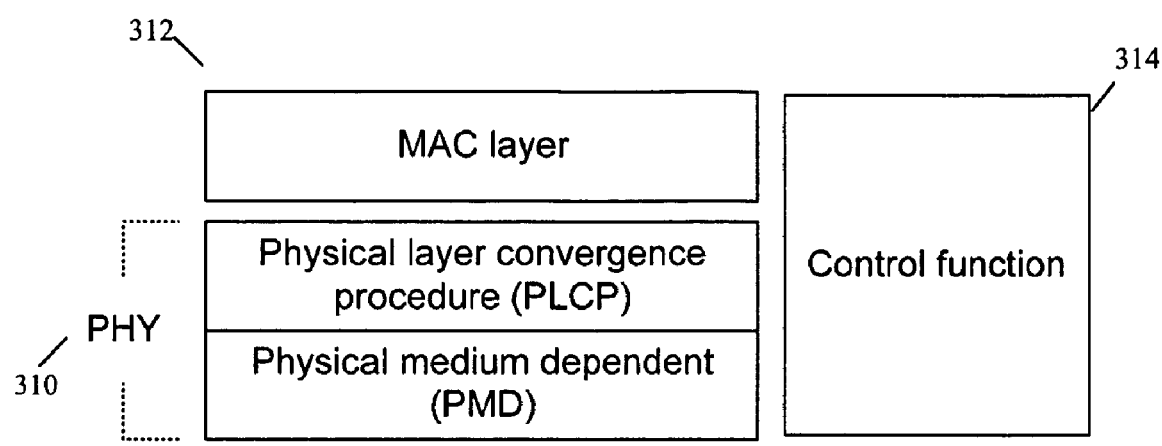
FIG. 8 shows the protocol architecture for both the access point and the STAs in FIG. 7, according to an embodiment of the present invention.

FIG. 8 shows the protocol architecture for each STA 304. Each STA 304 implements a WLAN PHY layer 310, a MAC layer 312, and a channel access control function 314. The PHY layer 310 includes two sub-layers: a physical layer convergence procedure (PLCP) sub-layer and a physical medium dependent (PMD) sub-layer. The MAC layer 312 constructs MAC packets from frames of data, and provides them to the PHY layer 310 for transmission over a shared wireless channel. Similarly, the AP 302 also includes a MAC layer and a PHY layer, as described.

In this example the control function 314 in each STA 304 (and/or the AP 302) implements a communication method using a L-SIG TXOP Protection approach that adds a small legacy format frame (e.g., frame 51 in FIG. 4) at the end of an L-SIG TXOP Protection sequence, according to an embodiment of the present invention. The small legacy format frame terminates the EIFS procedure at receiving L-stations, as described above (e.g., FIGS. 4-6). Though in this example the control function 314 is shown external to the MAC layer 312, in another example of the present invention the control function 314 can be a logical component of the MAC layer 312 in the AP 302 and/or each STA 304. As such, the control function 314 can be a component in each of one or more of L-stations. The control function 314 can also be a component of one or more HT-stations.

Each STA further includes the general capability to: detect an existing WLAN; join or synchronize with that WLAN; authenticate with that WLAN; transmit frames to other stations in that WLAN; receive frames from other STAs in that WLAN; and encrypt/decrypt frames being transmitted or received. For some WLANs, the AP is used to provide a central (or "point") coordination function. The AP is also referred to as a "base station". Physically, the AP provides a "center point" for a collection of STAs. Usually an AP has a network interface card (NIC) implementing a WLAN PHY layer, a MAC layer, and a management function, and also has other (NICs) connecting to a wired network.

In one example, in the presence of the AP, the STAs no longer communicate with one another directly. All frames are transmitted to the AP, and the AP transmits them to their destined wireless stations. Since the AP is retransmitting all frames, the STAs are no longer required to be in range of one another. The only requirement is that the STAs be within range of the AP. In FIG. 7, as an example, if the STA1 sends a frame to the STA2, then the STA1 first sends the frame to the AP, and the AP retransmits the frame to the STA2. The wireless channel is shared using a Carrier Sense Multiple Access with Collision Avoidance (CSMA/CA) method.

Although in the description of FIG. 7 the STAs 304 and the AP 302 have been shown separately, each is a type of wireless communication station capable of transmitting and/or receiving over a wireless channel in a wireless communication system such as a WLAN. Therefore, a wireless communication station herein can function as a transmitter, a receiver, an initiator and/or a responder. It then follows that an AP can function as a transmitter, a receiver, an initiator and/or a responder. Similarly, an STA can function as a transmitter, a receiver, an initiator and/or a responder. Further, a wireless communication station can be an L-station or an HT-station. In addition, the control function 314 can be a logical module or a component, in each of one or more wireless communication stations. An AP may also function as an L-station or an HT-station.

According to the IEEE 802.11 specification (IEEE Wireless LAN Edition (2003), "A compilation based on IEEE Std 802.11-1999 (R2003) and its amendments", incorporated herein by reference), reception of an error-free frame at a L-station during the EIFS period resynchronizes the station to the actual busy/idle state of the wireless communication channel. As such, the EIFS period is terminated, and normal channel access (using DIFS and, if necessary, backoff) continues following reception of said error-free frame. In the L-SIG TXOP Protection approach, if the last frame within a L-SIG TXOP Protection sequence is sent with a legacy frame format, and a L-station begins an EIFS period before the start of the legacy format frame, then the L-station can receive the frame successfully and resume a DIFS period from the end of the L-SIG TXOP Protection sequence. In this case there is no unfairness problem for L-stations in accessing a shared communication channel.

In a WLAN that implements IEEE 802.11n (S. A. Mujtaba, "TGn Sync Proposal Technical Specification," IEEE 802.11-04-0889r7, July 2005, incorporated herein by reference), the last frame within the L-SIG TXOP Protection sequence can be very large. The data rate for transmitting a legacy format frame is usually much lower than the data rate for a HT format frame. As such, transmission of legacy format frames taxes transmission bandwidth since transmission time is much longer for large frames with the legacy format than frames with the HT format. In accordance with other features of the present invention, the above examples of the present invention are useful in increasing the efficiency of legacy format frame transmission for large frames. The above examples of the present invention are further useful in cases when improper EIFS setting occurs due to format and capability mismatching in the IEEE 802.11 series of WLANs. Further, in one example of the present invention can be integrated with both L-SIG TXOP Protection and LongNav approaches to reduce the unfairness problem caused by such improper EIFS setting.

In accordance with other features of the present invention, in IEEE 802.11n WLANs that include HT-stations with different capabilities such as Multipoint Communication System (MCS), the above examples of the present invention are useful in increasing the probability that different HT-stations with different capabilities have similar access to a shared communication channel.

As is known to those skilled in the art, the aforementioned example architectures described above, according to the present invention, can be implemented in many ways, such as program instructions for execution by a processor, as logic circuits, as an ASIC, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of wireless communication in a wireless local area network (WLAN) including legacy stations (L-stations) and high-throughput stations (HT-stations), comprising the steps of:
   initiating a legacy signal field (L-SIG) transmission opportunity protection (TXOP) Extended Physical Layer (PHY) Protection (EPP) sequence; and
   appending a legacy frame comprising L-station legacy fields to the end of the L-SIG TXOP EPP sequence causing termination of an extended inter-frame space (EIFS) procedure at an L-station such that the L-station resumes normal channel access, wherein probability for the L-station to gain access to a shared communication channel relative to the HT-stations is increased, such that the L-SIG TXOP EPP sequence with the legacy frame reduces channel access unfairness in the WLAN, and the L-station legacy fields comprising legacy training fields (L-TFs) and a legacy signal field;
   appending another legacy frame to the end of the L-SIG TXOP EPP sequence, wherein the step of appending another legacy frame to the end of the L-SIG TXOP EPP sequence enables L-stations which cannot hear the first legacy frame, to terminate the EIFS procedure, and
   if the last frame in the L-SIG TXOP EPP sequence is shorter than the EIFS period, then setting the L-SIG TXOP EPP duration in the L-SIG to the end of the second to the last frame.

2. The method of claim 1 wherein the step of appending a legacy frame to the end of the L-SIG TXOP EPP sequence further includes the steps of appending a small legacy format frame at the end of the L-SIG TXOP EPP sequence.

3. The method of claim 1 wherein the L-SIG TXOP EPP sequence with the legacy frame reduces channel access unfairness in the WLAN caused by EIFS.

4. The method of claim 2 wherein the small legacy format frame at the end of an L-SIG TXOP EPP sequence comprises a CF-END frame according to the IEEE 802.11n specification.

5. The method of claim 2 wherein the small legacy format frame at the end of an L-SIG TXOP EPP sequence comprises a QoS-Null frame according to the IEEE 802.11e specification.

6. The method of claim 1 further comprising the step of transmitting the last frame in legacy format with legacy basic rate.

7. The method of claim 1 further including the step of:
   if the precise duration of the last frame in the L-SIG TXOP EPP sequence is unknown, then setting the L-SIG TXOP EPP duration in the L-SIG to earlier than the end of the second to the last frame.

8. The method of claim 7 further comprising the steps of transmitting the last frame in legacy format with a legacy basic rate.

9. The method of claim 1 wherein appending a legacy frame to the end of the L-SIG TXOP EPP sequence further includes the steps of setting the L-SIG TXOP EPP duration to the end of the L-SIG TXOP EPP sequence, to cause resumption of normal channel access at an L-station.

10. The method of claim 1 wherein said another legacy frame comprises a small legacy format frame.

11. A wireless communication system, comprising:
   multiple communication stations including one or more legacy stations (L-stations) and high-throughput stations (HT-stations); and
   a control function that is configured for causing initiation of a legacy signal field (L-SIG) transmission opportunity protection (TXOP) Extended Physical Layer (PHY) Protection (EPP) sequence, for setting the L-SIG TXOP Protection duration to the end of the L-SIG TXOP Protection sequence, for causing termination of an extended inter-frame space (EIFS) procedure at an L-station such that the L-station resumes normal channel access, and for appending a legacy frame comprising L-station legacy fields to the end of the L-SIG TXOP EPP sequence for causing termination of the EIFS procedure at an L-station, wherein probability for the L-station to gain access to a shared communication channel relative to the HT-stations is increased, such that the L-SIG TXOP EPP sequence with the legacy frame reduces channel access unfairness in the WLAN, and the L-station legacy fields comprising legacy training fields (L-TFs) and a legacy signal field, wherein the control function is further configured such that if the last frame in a L-SIG TXOP EPP sequence is shorter than an EIFS period, then the control function sets the L-SIG TXOP Protection duration in the L-SIG to the end of the second to the last frame, and to append another legacy frame to the end of the L-SIG TXOP Protection sequence to enable L-STAs which cannot hear the first legacy frame, to terminate the EIFS procedure.

12. The system of claim 11 wherein the control function is further configured to cause transmission of a MPDU with MAC Duration=0, carried in a basic rate legacy PPDU, after a SIFS time period beyond a L-SIG TXOP Protection duration.

13. The system of claim 12 wherein the MPDU with MAC Duration=0, comprises a CF-END frame according to the IEEE 802.11n specification.

14. The system of claim 12 wherein the MPDU with MAC Duration=0, comprises a QoS-Null frame according to the IEEE 802.11e specification.

15. The system of claim 11 wherein the control function is further configured such that if the last frame in a L-SIG TXOP Protection sequence is longer than an EIFS period, then the control function sets the L-SIG TXOP Protection duration in the L-SIG to the end of the last frame.

16. The system of claim 15 wherein the format and rate limitation for transmission of the last frame in the L-SIG TXOP EPP sequence are selected according to application.

17. The system of claim 16 wherein the control function is further configured to cause transmission of an MPDU with MAC Duration=0, carried in a basic rate legacy PPDU, after a SIFS time period beyond the L-SIG TXOP Protection duration.

18. The system of claim 16 further including third party stations that are enabled to terminate the EIFS procedure based on the legacy frame, to avoid potential unfairness or a capture effect for L-stations.

19. The system of claim 17 wherein the MPDU with MAC Duration=0, comprises a CF-END frame according to the IEEE 802.11n specification.

20. The system of claim 17 wherein the MPDU with MAC Duration=0, comprises a QoS-Null frame according to the IEEE 802.11e specification.

21. The system of claim 11 wherein the control function is further configured such that if the last frame in a L-SIG TXOP EPP sequence is shorter than an EIFS period, and the precise duration of the last frame is unknown, then the control function sets the L-SIG TXOP Protection duration in the L-SIG to earlier than the end of the second to the last frame.

22. The system of claim 12 wherein:
a first of the communication stations is configured to function as an initiator that implements said control function which is configured to cause transmission of the MPDU with MAC Duration=0; and
a second of the communication stations is configured to function as a responder to receive the MPDU from the initiator, and transmit another MPDU with MAC Duration=0, carried in a basic rate legacy PPDU.

23. The system of claim 22 further including third party stations configured to receive from the responder, but not the initiator, wherein the L-SIG TXOP EPP sequence with the signaling field causes third party stations to terminate the EIFS procedure to avoid potential unfairness or a capture effect for L-stations.

24. The system of claim 22 wherein the MPDU with MAC Duration=0, comprises a CF-END frame according to the IEEE 802.11n specification.

25. The system of claim 22 wherein the MPDU with MAC Duration=0, comprises a QoS-Null frame according to the IEEE 802.11e specification.

26. The system of claim 11 wherein the legacy frame comprises a small legacy format frame.

27. A wireless communication system including a communication station, the communication station comprising:
a control function that is configured to append a legacy frame comprising legacy station (L-station) legacy fields to the end of a legacy signal field (L-SIG) transmission opportunity protection (TXOP) Extended Physical Layer (PHY) Protection (EPP) sequence for transmission of frames; and
a transmission function that is configured for transmitting the L-SIG TXOP EPP sequence frames along with the appended legacy frame, wherein the appended legacy frame causes termination of an extended inter-frame space (EIFS) procedure at an L-station such that the L-station resumes normal channel access, wherein probability for the L-station to gain access to a shared communication channel relative to HT-stations is increased, such that the L-SIG TXOP EPP sequence with the legacy frame reduces channel access unfairness in the WLAN, and the L-station legacy fields comprising legacy training fields (L-TFs) and a legacy signal field, wherein the control function is further configured such that if the last frame in the L-SIG TXOP EPP sequence is shorter than the EIFS period, then the control function sets the L-SIG TXOP EPP duration in the L-SIG to the end of the second to the last frame, and to append another legacy frame to the end of the L-SIG TXOP EPP sequence to enable L-stations which cannot hear the first legacy frame, to terminate the EIFS procedure.

28. The communication station of claim 27 wherein the legacy frame comprises a small legacy format frame.

29. The communication station of claim 27 wherein the communication system comprises a WLAN, such that the L-SIG TXOP EPP sequence with the legacy frame reduces channel access unfairness in the WLAN.

30. The communication station of claim 29 wherein the WLAN implements a IEEE 802.11n wireless communication protocol.

31. The communication station of claim 28 wherein the small legacy format frame at the end of an L-SIG TXOP EPP sequence comprises a CF-END frame according to the IEEE 802.11n specification.

32. The communication station of claim 28 wherein the small legacy format frame at the end of an L-SIG TXOP EPP sequence comprises a QoS-Null frame according to the IEEE 802.11e specification.

33. The communication station of claim 27 wherein the transmission function is further configured to transmit the last frame in legacy format with legacy basic rate.

34. The communication station of claim 27 wherein the control function is further configured such that if the precise duration of the last frame in the L-SIG TXOP EPP sequence is unknown, then the control function sets the L-SIG TXOP EPP duration in the L-SIG to earlier than the end of the second to the last frame.

35. The communication station of claim 28 wherein the control function is further configured to set the L-SIG TXOP EPP duration to the end of the L-SIG TXOP EPP sequence.

36. The communication station of claim 28 wherein the control function is further configured such that if the last frame in the L-SIG TXOP EPP sequence is longer than the EIFS period, then the control function sets the L-SIG TXOP EPP duration in the L-SIG to the end of the last frame.

37. A method of wireless communication in a wireless local area network (WLAN) including legacy stations (L-stations) and high-throughput stations (HT-stations), comprising the steps of:

- initiating a legacy signal field (L-SIG) transmission opportunity protection (TXOP) Extended Physical Layer (PHY) Protection (EPP) sequence;
- appending a legacy frame comprising L-station legacy fields to the end of the L-SIG TXOP EPP sequence causing termination of an extended inter-frame space (EIFS) procedure at an L-station such that the L-station resumes normal channel access, wherein probability for the L-station to gain access to a shared communication channel relative to the HT-stations is increased, such that the L-SIG TXOP EPP sequence with the legacy frame reduces channel access unfairness in the WLAN, and the L-station legacy fields comprising legacy training fields (L-TFs) and a legacy signal field;
- appending another legacy frame to the end of the L-SIG TXOP EPP sequence, wherein the step of appending another legacy frame to the end of the L-SIG TXOP EPP sequence enables L-stations which cannot hear the first legacy frame, to terminate the EIFS procedure, and
- if the last frame in the L-SIG TXOP EPP sequence is shorter than the EIFS period, then setting the L-SIG TXOP EPP duration in the L-SIG to the end of the second to the last frame.

* * * * *